UNITED STATES PATENT OFFICE.

OTTO ERNST AND HEINRICH EICHWEDE, OF HÖCHST-ON-THE-MAIN, GERMANY, ASSIGNORS TO FARBWERKE VORM. MEISTER LUCIUS & BRÜNING, OF HÖCHST-ON-THE-MAIN, GERMANY, A CORPORATION OF GERMANY.

MONOAZO DYE AND PROCESS OF MAKING.

978,865.  Specification of Letters Patent.  Patented Dec. 20, 1910.

No Drawing.  Application filed April 4, 1910.  Serial No. 553,425.

*To all whom it may concern:*

Be it known that we, OTTO ERNST, Ph. D., chemist, and HEINRICH EICHWEDE, Ph. D., chemist, citizens of the Empire of Germany, residing at Höchst-on-the-Main, Germany, have invented certain new and useful Improvements in Monoazo Dyestuffs and Processes of Making Same, of which the following is a specification.

We have found that a monoazo dyestuff of valuable properties for the manufacture of color-lakes is obtained by combining the diazo compound of the 2-4-dinitranilin-6-sulfonic acid with 2-naphthol-3-carboxylic acid. The lakes produced from this dyestuff are particularly distinguished by the following properties:—They give a clear bluish-red tint; they are easily precipitated, cover well, are insoluble in oil and very fast to light, in which respect they are for instance considerably superior to the lakes of the dyestuff obtained from para-nitranilin-ortho-sulfonic acid and beta-oxynaphthoic acid, described in U. S. Patent No. 741,029. In view of the fact that dinitranilin-sulfonic acids have hitherto not been used for preparing dye-lakes, it has not been possible to draw any conclusions as to the properties of the said dyestuff.

The manufacture of the dyestuff may be carried out by combining the diazo compound of the 2.4-dinitranilin-6-sulfonic acid with an equivalent quantity of beta-oxynaphthoic acid of melting point 216° C., in presence of sodium carbonate or, preferably, sodium acetate as an acid combining agent; the coupling may also be effected by means of a mineral acid alone, in which case it is advantageous to previously precipitate the beta-oxynaphthoic acid from the solution of the sodium salt by means of a dilute mineral acid, in a fine aqueous suspension. The product is a dark-red powder, difficultly soluble in water and alcohol, insoluble in benzene, dissolving in concentrated sulfuric acid with a bluish-red color, and separating, on addition of water, as a red precipitate.

Owing to the fact that the dyestuff is only soluble with difficulty, it is best to use it in form of a paste; the dyestuff is suitable for preparing wall-paper colors as well as for making printing-colors and oil-colors.

Having now described our invention, what we claim is:—

1. The herein described process of manufacturing a red monoazo dyestuff suitable for preparing color-lakes, which consists in combining 2.4-dinitrodiazobenzol-6-sulfonic acid with beta-oxynaphthoic acid of melting point 216° C.

2. As new product, the dyestuff obtained by combining 2.4-dinitrodiazobenzol-6-sulfonic acid with beta-oxynaphthoic acid of melting point 216° C., being a dark-red powder, difficultly soluble in water and alcohol, insoluble in benzene, dissolving in concentrated sulfuric acid with a bluish-red color, and separating, on addition of water, as a red precipitate.

In testimony whereof, we affix our signatures in presence of two witnesses.

OTTO ERNST.
HEINRICH EICHWEDE.

Witnesses:
 JEAN GRUND,
 CARL GRUND.